Patented Oct. 20, 1925.

1,558,413

UNITED STATES PATENT OFFICE.

BORIS H. TEITELBAUM, OF BROOKLYN, NEW YORK, ASSIGNOR TO BRIGHT STAR BATTERY CO., OF NEW YORK, N. Y., A CORPORATION OF NEW YORK.

PROCESS OF MAKING DRY BATTERIES.

No Drawing.   Application filed May 26, 1921.   Serial No. 472,867.

*To all whom it may concern:*

Be it known that I, BORIS H. TEITELBAUM, a citizen of the United States, and a resident of the city of New York, borough of Brooklyn, in the county of Kings and State of New York, have invented a new and Improved Process of Making Dry Batteries, of which the following is a full, clear, and exact description.

This invention relates to a process of manufacturing dry batteries, and has particular reference to a new and improved process concerning the manufacture of the paste with which the battery receptacle is filled.

It is an object of the invention to provide a process whereby a paste may be made without the usual cooking step, which involves the use of cooking apparatus and the expenditure of heat, and also takes considerable time.

Another object of the invention resides in the provision of a process as hereinafter set forth which results in a much improved paste.

A further object resides in the provision of a process whereby the various steps are much more simply performed than heretofore with a considerable reduction in the time and labor involved.

Hitherto in making pastes for dry batteries, it has been customary to mix certain substances, such as sal ammoniac, zinc chloride, and a cereal mixture, in suitable proportions, during which mixing no particular attention was paid to the temperature changes of the mixture. This mixture was then placed in the battery receptacles, or zinc cups, and cooked for a predetermined period of time, during which time the gelatinization of the paste takes place. This process, however, required the use of cooking apparatus, which involved the expense of heat, and also required considerable time and made necessary considerable labor on the part of the operator.

My new and improved process relates to the mixing of ingredients, of which the above-mentioned ingredients are a preferred example, the mixing and the process as a whole being performed with particular observance of the temperature changes taking place in the mixture throughout the process. Since sal ammoniac is an endothermal substance, I make use of this property of the sal ammoniac in making a paste which will, as I have discovered, gelatinize at room temperature. This phase of my process, therefore, eliminates the necessity for producing gelatinization by cooking the materials of the dry battery. It is found that this process of gelatinization at ordinary temperatures without cooking not only saves the operation of cooking, in the manufacture of dry cell batteries, but also produces a paste of most desirable properties.

It is obviously a part of the invention that the various ingredients herein recited can be mixed together simultaneously whenever the objects to be achieved permit, whereby the endothermic reactions will take place in a shorter time than when the ingredients are not so mixed. In other words, if the ingredients are mixed together simultaneously, then the reaction takes place without cooking in a particular period of time, depending upon the quantities and proportions of the ingredients. On the other hand, if the ingredients are mixed in a certain definite sequential order, as herein recited, then the time of the reaction can be varied in the manner and over the periodical range set forth.

By varying the proportion of zinc chloride and starch flour mixture of those of sal ammoniac, the paste may be made to gelatinize in anywhere from five minutes to twenty-four hours. By way of illustration, I may mix the ingredients in the following manner and proportions: 3½ ounces of sal ammoniac are dissolved in 200 cubic centimeters of chloride of zinc solution of 27° Baumé at 22° centigrade. The endothermal properties of the sal ammoniac will cause the temperature of this mixture to decrease to approximately 0° C.

At this point, namely, when the mixture of sal ammoniac and zinc chloride has reached a certain minimum temperature, I prefer to add about 2.75 oz. of a mixture of two parts by weight of starch to one of flour. This mixture is known as a cereal mixture. This paste, during the addition of the cereal, is suitably mixed or agitated by any desired apparatus until a perfect homogeneous paste is obtained. The resulting temperature of the mixture of sal ammoniac, zinc chloride and cereal in the above proportions at the time that the homogeneous consistency is reached, is about 3 or 4° C. This paste is then, preferably, immediately placed within the battery receptacles, which may be in the form of zinc cups with depolarizing bags therein, both the cups and the bags being at room temperature. With the above mixture and proportions of ingredients, gelatinization will take place in approximately five minutes.

If I use 3½ oz. of sal ammoniac, 2.75 oz. of cereal mixture and 200 c. c. of zinc chloride solution of 21° Baumé, made and mixed at exactly the same temperature and in exactly the same manner as above described, the gelatinization will take place in approximately one hour and forty-five minutes. These two examples, therefore, will indicate the manner in which a slight variation of the ingredients will vary the period of gelatinization. It is to be observed, however, that the gelatinization takes place at temperatures from room temperature downward and that the necessity for cooking the paste in the receptacles, with its consequent expenditure of time, money and labor, is entirely eliminated. It is found that the resultant paste and batteries are of a much improved quality.

What I claim is:

1. The process of producing a dry battery paste involving the use of sal ammoniac, which comprises dissolving sal ammoniac in zinc chloride solution of a definite density and at a definite temperature, then permitting the endothermic properties of the sal ammoniac to reduce the temperature of the mixture to a definite temperature, and then adding a cereal mixture, whereby the resultant mixture will gelatinize in a definite time without the necessity of cooking it.

2. The process of manufacturing dry battery paste involving the use of an endothermic ingredient, which comprises adding a definite quantity of said endothermic ingredient to zinc chloride solution of a definite density and at a definite temperature, permitting the endothermic properties of said ingredients to reduce the temperature of the mixture by a definite amount, and then adding a cereal mixture, whereby the resultant product of paste will gelatinize in a predetermined time without the necessity of cooking.

3. The process of manufacturing dry battery paste, which comprises mixing the ingredients in approximately the following proportions: 3½ ounces of sal ammoniac dissolved in 200 c. c. of zinc chloride solution of 27° Baumé at 22° C., then permitting this mixture to reduce in temperature a predetermined amount, and then adding 2.75 ounces of a cereal mixture until a perfectly homogeneous paste is obtained.

4. The process of manufacturing dry battery paste, which involves the use of sal ammoniac, zinc chloride and a cereal mixture, and which comprises adding the sal ammoniac to one of the other ingredients, permitting the endothermic qualities of the sal ammoniac to reduce the temperature of the mixture a definite amount, and then adding the other ingredient to said mixture, whereby the resulting product will gelatinize in a predetermined time without cooking.

BORIS H. TEITELBAUM.